Jan. 4, 1966 A. RINZEMA ETAL 3,227,634

METHOD OF MANUFACTURING MOULDS FOR PRESSING PHONOGRAPH RECORDS

Filed Oct. 3, 1962

INVENTOR
ANNE RINZEMA
MARCEL J. EDELSTEIN
JAN C. VANHOUTEN
BY Frank R. Trifari
AGENT United States Patent Office 3,227,634

Patented Jan. 4, 1966

3,227,634
METHOD OF MANUFACTURING MOULDS FOR PRESSING PHONOGRAPH RECORDS

Anne Rinzema, Marcel Jacques Edelstein, and Jan Christoffel van Houten, Baarn, Netherlands, assignors to North American Philips Company, Inc., New York, N.Y., a corporation of Delaware Filed Oct. 3, 1962, Ser. No. 228,127
2 Claims. (Cl. 204—5)

This application is a continuation-in-part of our pending United States application Serial No. 16,447 filed March 21, 1960 and now abandoned.

Our invention relates to the manufacture of disc-shaped phonograph records from synthetic substances and more particularly to a method of making a stamper for such manufacture.

The term "metallic shell" as used herein is to be understood to include duplicates of the lacquer plates or master record as well as all negative and positive metallic prints obtained by electroplating, i.e. patrices, matrices and "sons" or stampers.

In pressing phonograph records from synthetic substances it is known from U.S. Patent 2,491,068 to secure to the blocks of a press, thin plate-shaped stampers provided with profiled edges. Such edges insure that the stampers will be readily and accurately positioned and firmly secured to the blocks.

In the known method of manufacturing phonograph records a sound track to be reproduced is cut into a lacquer plate to form a master record by means of a recording needle which is vibrated in accordance with the sound to be recorded. The lacquer plate usually comprises a metallic plate-shaped support carrying a thin layer of a suitable lacquer. After the sound track or grooves have been made in the lacquer layer the surface thereof is made electrolytically-conductive by applying thereto a thin layer of a suitable metal, such as silver. A layer of metal, usually copper or nickel, is then grown in an electroplating bath on the electrically-conductive surface of the lacquer layer. As a result there is obtained a patrix, negative or master stamper in the form of a metal plate carrying a raised image of the sound track. While such a negative could be employed as a mould or stamper to produce the records, this is usually not done because the lacquer plate is damaged when the negative is separated therefrom and thus if the negative should become damaged, it would be necessary to manufacture a new master in order to obtain another negative. Furthermore, there is the additional disadvantage that it is not possible to make a preliminary musical check. Therefore, it is the usual practice to form from the negative or patrix by electroplating a metal print called a matrix or positive from which are made in a similar manner, moulds known as "sons" or stampers. A profiled edge is pressed into the "son" or stamper.

In accordance with the method of our invention we form a metallic shell, from a master which includes both the vibration record or sound track as well as a profiled edge, by electroplating. This master may be a lacquer member provided with a profiled edge, which may be formed by pressing and thereafter a vibration record is made thereon, or the master may be a metal plate having a profiled periphery and a central lacquer portion in which the vibration record is made. Thus, the invention extends to the manufacture of all types of metallic shells (master, negative and stamper) used in the manufacture of phonograph records.

The master according to the invention has a profiled edge which preferably consists of a truncated-conical portion forming an angle of 90° or more with the surface of the plate-shaped portion of the shell which carries the sound track, and an annular portion extending substantially parallel to said surface.

In a preferred embodiment of the invention that surface of the annular portion upon which a new shell is to be grown in the electroplating bath is roughened for reasons to be set forth hereinafter.

By providing a master according to the invention greater rigidity is obtained and in addition warping of the metallic shells during reproduction thereof in the electroplating bath is avoided. As a result the metallic shells may be made much thinner and thus the time required for the electrolytical formation is reduced by about half. Such warping is usually caused by the shrinking tensions produced in the deposited metal forming the new metallic shell.

Since metallic shells made by our method do not wrap in the electroplating bath, the distance between the cathode and anode can be reduced. This results in a considerable saving of energy and time, while at the same time a better current distribution is obtained, which improves quality of the metallic shell being grown.

In order that the invention may be clearly understood and readily carried into effect, we shall describe the same in more detail with reference to the accompanying drawing in which, FIGURE 1 is a partial perspective view of a portion of a master according to our presently preferred form of the invention, i.e. a composite of a metal support dish and central lacquer disk having sound grooves formed therein.

Figures 1, 2, 3, 4, 5:
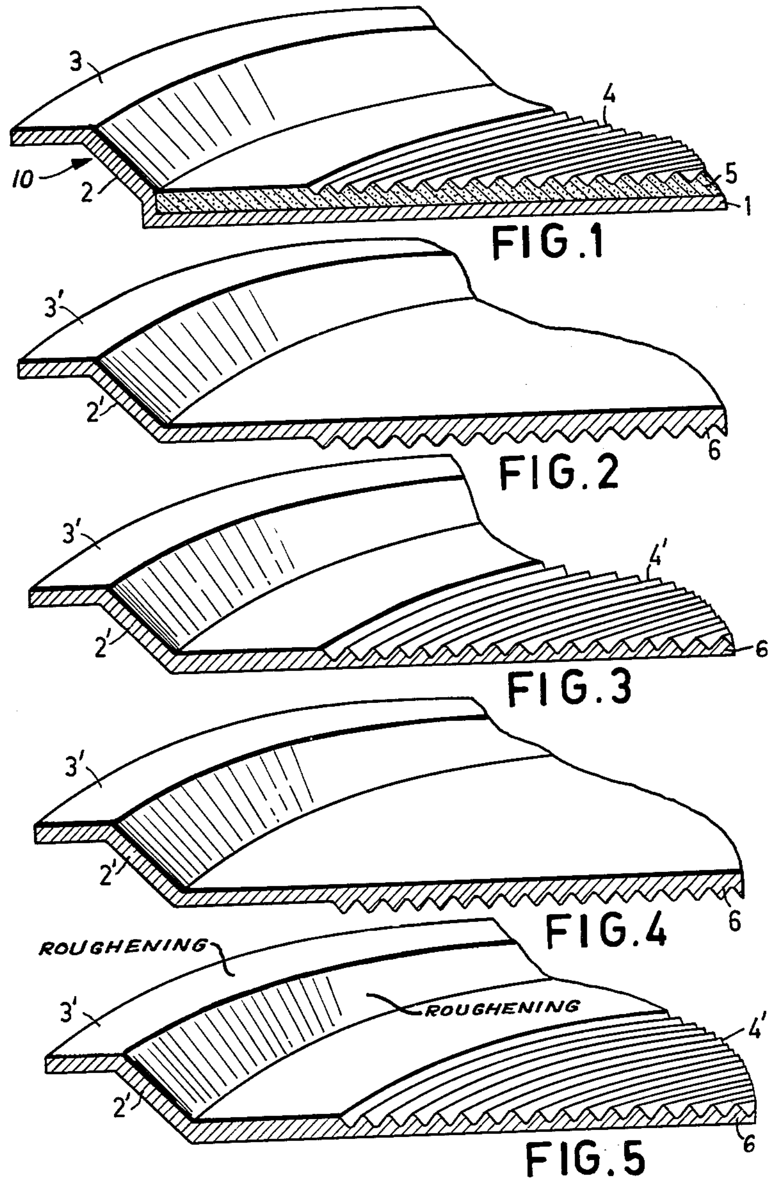
FIGURE 2 is a perspective view of a portion of a negative (patrix, master stamper).
FIGURE 3 is a perspective view of a portion of a positive (matrix).
FIGURE 4 is a perspective view of a portion of a stamper (son).
FIGURE 5 is a perspective view of a portion of a positive with roughened edge-portions.

The master shown in FIGURE 1 consists of a support member generally designated 10 provided with profiled edge portions 2 and 3 and a vibration record comprising lacquer disk 5 having grooves 4 according to the invention.

The disc-shaped central portion 1 is provided with a lacquer layer 5 (in any suitable manner) in which a sound track or grooves 4 are cut by means of a recording needle which is vibrated in accordance with the sound to be recorded in the known manner. As shown the profiled edge portions comprises a truncated conical portion 2 which forms an angle of more than 90° with the surface of the lacquer layer, and an annular portion 3 substantially parallel to the central portion. By methods known in the art and indicated above a layer of metal, usually copper or nickel is grown in an electroplating bath on the surface of the vibration record and support 10. As a result a negative or master stamper as shown in FIGURE 2 is obtained. The negative of the sound record designated 6 is now on the projecting side of the grown shell seen in FIG. 2. It is to be understood that it is not necessary to use a support and vibration record as shown in FIGURE 1 in the method according to the invention. Also a flat lacquer plate may be used (without parts 1, 2, 3). In some instances this even may be found to be more practical. The negative manufactured by electroplating the flat lacquer plate will then also be flat (i.e. without a profiled edge). The profiled edge portions 2' and 3' of the negative as shown in FIGURE 2 may, in this case, be obtained by pressing the flat metallic shell so formed into the desired profiled edge form, thus providing a profiled vibration record by electro-deposition. By electroplating the metallic shell shown in FIGURE 2, a metallic positive shell as shown in FIGURE 3 is obtained. The positive thus obtained is a replica of the vibration record and support seen in FIG. 1. It may be used to check the quality of the sound track grooves. From this positive, stampers or "sons" are made by electrodeposition; a perspective view of a portion of a stamper is shown in FIGURE 4.

FIGURE 5 is a perspective view of a portion of a positive made from the stamper of FIGURE 4 to illustrate that the surfaces of the peripheral portions 2' and 3' are roughened on the same side as the sound grooves 4, i.e. the side upon which a shell will be grown in the electroplating bath. The roughening may be effected in a number of ways, for instance with a wire brush. The roughening which is only shown in FIGURE 5 applied to the profiled edges of a positive stamper may also be applied to the master shown in FIG. 1, or its negative shown in FIGURE 2.

The roughening is to be applied to that surface upon which a metallic shell is grown in an electroplating bath. Because of the roughened surface of the portions 2' and 3', it is not necessary that the shell to be grown, be grown beyond the edges of the negative or positive of the master to form a stamper. The roughened surface provides sufficient adhesion to prevent any undesired disengagement during electroplating. This results in an important saving of time and material over prior methods in which it was necessary to grow the stamper larger in diameter than its patrix or matrix to prevent separation over the sound grooves due to internal tensions. Also of course there is no edge, or flash to be removed before the stamper could be separated from its matrix (patrix).

The vibration record having support 10 with edge 2–3 has the further advantage that it prevents damage to the sound grooves 4 of the master during its separation from the stamper, or vice versa, which damage can be caused by insertion of a wedge-shaped tool between the master and stamper or by small particles being disengaged from the edge of the shells and falling between the shell halves. The master according to the invention has the further advantage that it has a certain stabilizing effect and prevents any undesired swinging movement of the master while it is subjected to the usual rotational movement in the electroplating bath. The stampers made by our method may be attached to a suitable pressing block without further mechanical machining, with the exception that a central hole may be provided, if desired.

While we have described our invention with specific examples we do not desire to be limited thereto as obvious modifications thereof will readily appear to one skilled in this art.

In the claims:

1. A method of producing a stamper for making phonograph records, comprising the steps of forming a master having a vibration record on the surface of a disc-shaped member of lacquer material, supporting the vibration record on a member having a peripheral frustroconical portion inclined at an angle of more than 90° to said surface and an outer annular portion substantially parallel to said surface, and electroplating the surface of the said vibration record and its supporting member to form a shell therefrom.

2. A method of producing a stamper for making phonograph records, comprising the steps of forming a master having a vibration record on a surface of a disc-shaped member of lacquer material, supporting the vibration record on a member having a peripheral frustroconical portion inclined at an angle of 90° or more to said surface and an outer annular portion substantially parallel to said surface, roughening the surface of the said annular portion on the side of the said member adjacent said vibration record, and electroplating the surface of the said member including the vibration record to form thereon a stamper.

References Cited by the Examiner

UNITED STATES PATENTS

| | | | |
|---|---|---|---|
| 2,092,880 | 9/1937 | Hunter et al. | 204—5 |
| 2,327,762 | 8/1943 | Bull | 204—4 |
| 2,491,068 | 12/1949 | Adams | 204—5 |

JOHN H. MACK, *Primary Examiner.*

UNITED STATES PATENT OFFICE

CERTIFICATE OF CORRECTION

Patent No. 3,227,634 January 4, 1966

Anne Rinzema et al.

It is hereby certified that error appears in the above numbered patent requiring correction and that the said Letters Patent should read as corrected below.

In the heading to the printed specification, between lines 8 and 9, insert the following:

Claims priority, application Netherlands, Apr. 9, 1959, 237,972

Signed and sealed this 13th day of December 1966.

(SEAL)
Attest:

ERNEST W. SWIDER
Attesting Officer

EDWARD J. BRENNER
Commissioner of Patents